United States Patent [19]
Girguis

[11] Patent Number: 4,915,672
[45] Date of Patent: Apr. 10, 1990

[54] CONSTANT VELOCITY FIXED JOINT

[76] Inventor: Sobhy L. Girguis, Magdalenenstrasse 19, D-5210 Troisdorf-Oberlar, Fed. Rep. of Germany

[21] Appl. No.: 214,335

[22] Filed: Jul. 1, 1988

[30] Foreign Application Priority Data

Jul. 1, 1987 [DE] Fed. Rep. of Germany ....... 3721775

[51] Int. Cl.⁴ .............................................. F16D 3/23
[52] U.S. Cl. ..................................... 464/145; 464/906
[58] Field of Search ................ 464/143, 144, 145, 906

[56] References Cited

U.S. PATENT DOCUMENTS 3,928,985 12/1975 Girguis ........................... 464/906 X
4,156,353 5/1979 Welschof ............................ 464/145
4,494,941 1/1985 Hirai et al. .......................... 464/145
4,698,047 10/1987 Welschof et al. .................... 464/145

FOREIGN PATENT DOCUMENTS 624463 1/1936 Fed. Rep. of Germany ...... 464/145
2127132 4/1984 United Kingdom ................ 464/145

Primary Examiner—Daniel P. Stodola
Attorney, Agent, or Firm—Davis, Bujold & Streck

[57] ABSTRACT

A constant velocity fixed joint having two transmitting parts and a cage, the transmitting parts include a hollow outer part having races on its internal surface and an inner part having corresponding races on its external surface, with balls disposed therein; the cage is located between the two transmitting parts and centers the balls in a ball plane, the contact points between the balls and the races lying on one side of the ball plane in one direction of rotation and when in the straight position of the joint; the main parts have angular travel about a joint center via an external centering surface angularly displaceable with the inner part coacting with an internal centering surface angularly displaceable with the cage and an external centering surface angularly displaceable with the cage coacting with an internal centering surface angularly displaceable with the outer part, one the centering surfaces is associated with a supporting disk angularly displaceable with one the main parts on which that one main part is axially supported but radially displaceable.

30 Claims, 11 Drawing Sheets

CONSTANT VELOCITY FIXED JOINT

The invention relates to constant velocity fixed joints. In torque transmission of such a joint, as illustrated by U.S. Pat. No. 2,046,584 FIG. 3, the transmitting parts are axially loaded in one direction by the balls, while the cage is axially loaded in the other direction, the transmitting parts being supported by the cage, the inner part on one side of the ball plane, the outer part on the other. The relative radial position of the inner to the outer part is determined by two systems: the transmitting system and the centring system.

In torque transmission, the inner part will be force-centered in the outer part by the radial components of the transmitting forces along the ball plane. The position of the inner part relative to the outer part therefore depends on the positional accuracy of the contact points of the outer and inner parts.

At the angular condition, the balls move to and fro along the races; whereby due to the manufacturing tolerances of the races, the position of the inner part relative to the outer part will change periodically. The loading of the ball is further subject to considerable variations during its orbiting movement, leading to a corresponding change in the relative position of the inner to the outer part. These variations, which are non-corotatory in principle, are caused, among other reasons, by the secondary torque and the varying local elasticity of the transmitting parts at the contact points concerned.

The centering system is provided by the centering surfaces of the outer part, the cage and the inner part. Through the effect of the sum of the axial components of the transmitting forces, the inner part will also be force-centered relative to the outer part by means of the cage. The position of the inner part relative to the outer part is hereby determined by the positional accuracy of the centering surfaces.

Thus the radial position of the inner part relative to the outer part will be defined by two superimposed centering systems and therefore overdefined. As a result, the inner part takes an intermediate position, leading to a radial or one-sided distortion between the transmitting and centering systems. The centering and transmitting surfaces are subjected to additional constraining forces and, moreover, eccentricly loaded. Thus the ball plane will be displaced from its angle-bisecting plane. The quality of the joint will be correspondingly reduced with regard to torque transmission, friction losses, service life and noisiness.

Axial asymmetries, such as occur when the races of the outer part do not mirror those of the inner part in respect to the ball plane at the angular condition, also lead to a displacement of the ball plane from its correct position and thus to a distortion of the joint. DE OS 3,233,753 describes means of reducing axial asymmetries resulting from play of the centering surfaces or from the penetration of the balls into the window surfaces.

The invention aims at the considerable reduction of the above mentioned distortion of the transmitting and centering systems by simple means.

The invention is based on the idea that a radial uncoupling of one of the transmitting parts from the cage would result in relieving the distortion of the joint. Whether the inner or the outer part is radially uncoupled is irrelevant in principle. It is therefore possible to allocate any of the centering surfaces to a supporting disk.

In the embodiment in which the inner part, for instance, is supported on a supporting disk in a radially movable or floating manner, the axial force is transmitted from the inner part via the supporting disk to the cage. If the centering systems are not in accordance, the inner part moves relative to the supporting disk within the range of radial play between the inner part and the cage to compensate the non-accordance in the radial direction. When the joint is straight, all transmitting and centering surface eccentricities can be neutralised.

If the joint is at angle, the misalignment between the axes of the races and the external surface of the inner part is compensated directly, while the misalignment between the axes of the races and the centering surface of the outer part is compensated indirectly. The misalignment between the axes of the centering surfaces of the cage is largely eliminated, resulting in a negligible axial deviation of the symmetry of the ball plane—the balls, however, remain in an angle-bisecting plane.

The effect of the floating allowance of the supporting disk in the joint at angle is by no means limited to the compensation of radial errors; symmetry deviations of the ball plane are also largely compensated. Here, too, the ball plane remains angle-bisecting. Load concentrations caused by the distortion of the joint are considerably reduced.

In consequence, the performance of the joint will be greatly improved, while manufacturing tolerances become less critical, making reductions in manufacturing costs possible. The grinding of various surfaces, which is common practice in the production of these joints, may, for instance, be omitted.

Further developments of the invention combining several variants are possible in principle.

In order to enable the centering surface of the supporting disk in conjunction with the corresponding centering surface always to fulfil its centering function in a definite manner and without being influenced by the components in contact with the supporting disk, an adequate radial play or a separation gap between the parts concerned is required.

In a development of the invention, the minimum width of the separation gap may correspond to the maximum expected radial misalignment between the parts defining the separation gap. In this case, the statistics of application, i.e. manufacturing tolerances, torque values, joint angles and elasticity, in particular of the outer parts, have to be taken into account. Too large a separation gap, though increasing the designer's freedom of action with regard to assembly, such as in the insertion of the inner part into the cage and of the cage into the outer part, requires a radial space which might be better used for the improvement of race depth. Too small a separation gap may lead to loss of some radial compensation capability when several extreme conditions are combined, resulting in residual distortion, so that, for instance, the external surface of the inner part is marginally supported on the internal surface of the cage.

The features of providing recesses in the supporting disk at the extension of the races of the inner or outer part apply to arrangements where the ball movement along the races of the inner or outer part enters into the area of the supporting disk, for instance at a greater joint angle or during the assembly of the joint, ensuring the free movement of the balls. Here the rotation of the supporting disk relative to the inner or outer part has to be limited without impeding its radial movement.

Surface contact between the supporting disk and the associated centering surface leads to an optimisation of surface pressure. A conformity in a longitudinal plane results in rotational centering surfaces. A conformity in a transverse plane results in quasi-multiple line contact in radial planes with a longer axial overlap. Allround conformity is more advantageous with regard to lubrication and accuracy requirements.

The relative movement of the supporting disk on its corresponding plane face is minor, but the reduction of frictional forces, in particular boring friction, permits the free movement and centering of the parts. The supporting disk may, for instance, be coated or impregnated with phosphate or plastic. Friction along the centering surface is further reduced by this surface treatment without additional elements. Friction corrosion on the plane face can thus be prevented or reduced easily.

The supporting disks are mainly compressively loaded, making their production of, for instance, a fibre reinforced plastic, as provided for in a further development of the idea of the invention, particularly suitable and cost-effective.

The supporting disk is guided by a corresponding centering surface in a radially floating manner, i.e. completely independent of the part contiguous to its plane face. Reliable allround guidance up to the maximum angle of the joint is therefore particularly advantageous.

Owing to the wear of the centering surfaces and plane faces and the penetration of the balls into the window faces, the outer part, the inner part and the cage are displaced relative to the ball plane in one direction, resulting in a symmetry deviation of the ball plane relative to the races of the outer or inner part. The measures of compensating the axial penetration of the balls in the window faces or the wear of the centering surfaces, at the mid-life of the joint, will minimise the symmetry deviation of the ball plane throughout the life of the joint. In the new joint, the distance of the center point of the inner part races from the ball plane is smaller than that of the outer part races, being the same half-way through the life of the joint and larger towards its end. Manufacturing tolerances of the varying axial functional incremental dimensions of the joint components can be compensated simply by suitable selection of the width of the supporting disk. Since the supporting disk is an independent and relatively low-cost component of the joint, it can be produced in a range of widths, enabling manufacturing tolerances or wear to be compensated by installing a supporting disk of suitable width.

By the provision of a floating spacer, at least two pairs of plane faces are made available, resulting in a further optimisation of sliding match, in particular if the spacer is made of a low-friction material. The spacers can further have varying wall thicknesses, so that, after determination of the actual dimensions of the outer part, the cage, the inner part and the supporting disk, suitable spacers can be installed for the precise location of the ball plane relative to the races of the outer or inner part.

Races with a center point on the axis of rotation of the transmitting part concerned are called circular. A particularly impressive further development of the invention provides for non-circular races of the transmitting part concerned. Extreme design variants of this type are illustrated in U.S. Pat. No. 2,046,584 FIG. 5. If the races lie in meridian planes, each, for instance, comprising a circular and a straight section, it may happen that, when the joint is deflected, some balls lie on the circular sections while the opposing balls lie on straight sections. The inclination of the circular races relative to the ball plane is substantially smaller as a rule than that of the straight races, resulting in an extremely different division of the transmitting forces of the balls into radial and axial components. The axial misalignment between inner and outer part is therefore additionally affected quite irrespective of geometrical accuracies.

In the joint designs of prior art, the different inclinations of opposed races relative to the ball plane may easily cause one or more balls to lose contact with their races, resulting in a considerable overall reduction of the control and transmission capabilities of the joint—in comparison with joints having circular races. In the joint design according to the present invention, these additional disadvantages are largely eliminated.

The races of the transmitting parts may therefore be designed straight or curved as desired, for instance without undercut allowing for certain manufacturing processes. In conjunction with an embodiment, in which the supporting disk is radially movable relative to the outer part, the internal surface of the outer part may be designed as desired, also without undercut allowing for certain manufacturing processes.

Various embodiments of the invention are described below in principle with reference to the accompanying diagrammatic representations illustrating further inventive features.

Of these drawings

Figure 1:
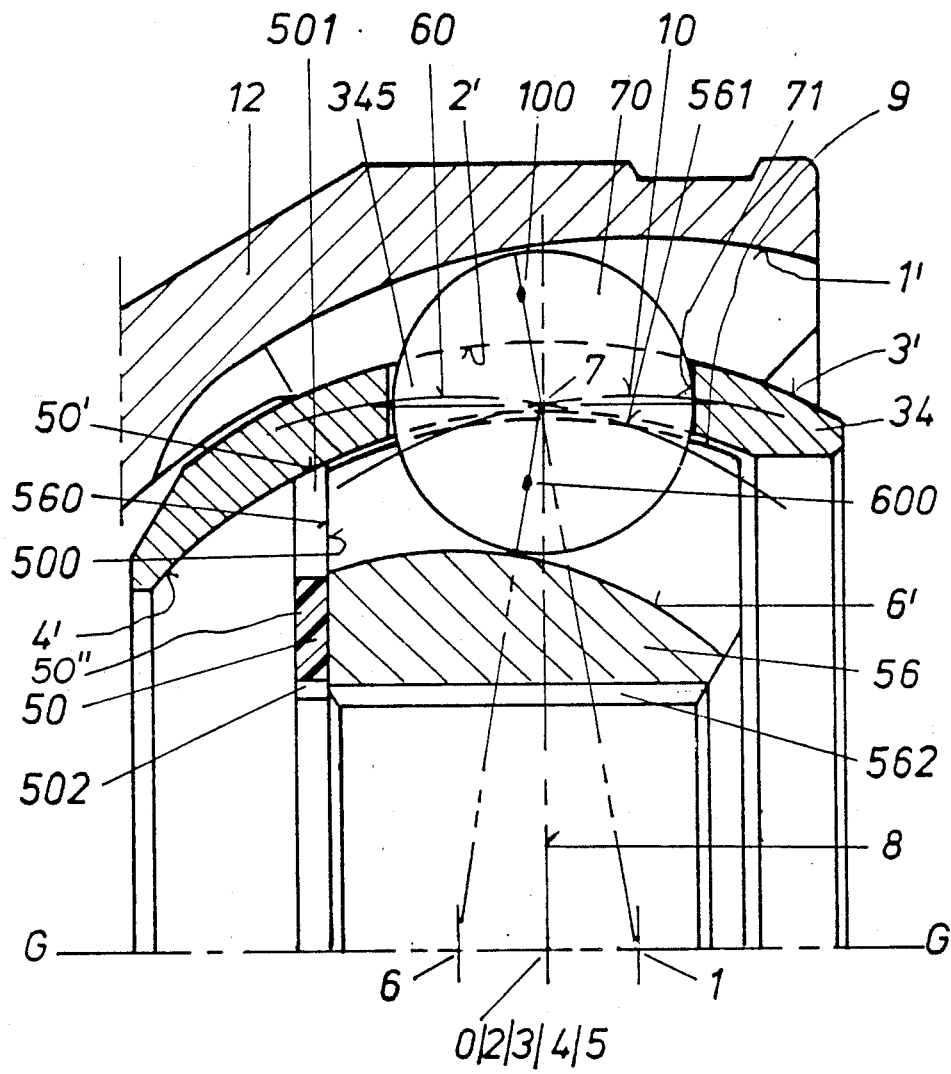
FIG. 1 is a half longitudinal section of a joint according to the invention in its straight condition, a supporting disk made of plastic, for instance, being provided between the cage and a plane face of the inner part.

FIG. 1 shows a constant velocity fixed joint with two transmitting parts, comprising an outer part 12, an inner part 56, a cage 34, a plurality of balls 70 and a supporting disk 50. The cage 34 with its centering surface 3' is pivotably centered in the centering surface 2' of the outer part 12. The supporting disk 50 with its centering surface 50' is pivotably centered in the centering surface 4' of the cage 34, its plane face 500 being in contact with the plane face 560 of the inner part 56. The windows 345 of the cage 34 hold the center points 7 of the balls 70 in an angle-bisecting ball plane 8 intersecting the axis of rotation G—G of the joint in the joint center point 0. The center points 2, 3, 4 and 5 of the centering surfaces 2', 3', 4' and 50' are shown to coincide with the joint center point 0. For torque transmission, the balls 70 engage with the races 1' and 6' of the outer and inner parts. The so-called circular races 1' and 6' are in reality toroidal with an elliptical cross-section, the center points 1 and 6 of their circular race axes 10 and 60, which are located in meridian planes, lying on the axis of rotation G—G of the joint; they are equi-distant from the ball plane 8. The contact points 100 and 600 between the balls 70 and the races 1' and 6' lie on the planes of loading 1-7 and 6-7 and to the left of the ball plane 8.

As a result of the inclination of the races 1' and 6' relative to the ball plane 8 and of the position of the contact points 100 and 600, the transmitting force between each ball 70 and the races 1' and 6' is divided into a circumferential, a radial and an axial component. The sum of the axial force components or axial forces pushes the transmitting parts 12 and 56 towards the left and the cage 34 towards the right. The cage 34 is centered in the outer part 12 by means of the centering surfaces 2' and 3'; the inner part 56 transmits the axial force component further to the supporting disk 50 supported in the cage 34 by the centering surfaces 50' and 4'.

The radial position of the supporting disk 50 relative to the outer part 12 depends on the eccentricities of the centering surface 2' relative to the outer part 12 and of the centering surface 3' relative to the centering surface 4' of the cage 34, being determined by the amount and direction of these eccentricities. By the radial component of the transmitting forces, the inner part 56 is force-centered relative to the outer part 12 along the ball plane 8 in the manner of a clamping system. The position of the inner part relative to the outer part is therefore chiefly determined by pitch and concentricity errors of the races 1' and 6' relative to each other and to the transmitting part 12 or 56 and by the flatness of the window surfaces 71.

In this embodiment of the invention, a radial movement is introduced between the inner part 56 and the supporting disk 50, so that both the inner part 56 and the supporting disk 50 can, independently of each other, adopt the positions dictated by the prevailing eccentricities without affecting each other, apart from any frictional forces which may occur between their plane faces 500 and 560. In this way, the transmission forces of each ball at a given relative pitch and concentricity error of the races 1' and 6' are optimised, while any planar deviations of the ball plane 8 are compensated. If wear takes place, for e.g. on higher loaded or softer races or window faces, the inner part 56 adopts a correspondingly altered position—thus balancing the forces out.

In this way, the transmitting capability of the joint is optimised independent of the amount of the radial inaccuracies of its sundry functional surfaces. This means that misalignments between the axes of the races 1' and the centering surface 2' of the outer part 12, between the axes of the centering surfaces 3' and 4' of the cage 34 and between the axes of the external surface 561 and the races 6' of the inner part 56 are completely neutralised in the straight joint by the allround radial freedom of movement of the supporting disk 50 relative to the inner part 56.

The width of the supporting disk 50 can determine the distance of the center point 5 of the centering surface 50' from the center point 6 of the races 6'. If the width of the supporting disk 50 is specified at the assembly of the joint and after determination of the actual axial dimensions of the functional surfaces, for instance by classification or by means of spacers 50a (broken line in FIG. 6), the relative position of the ball plane 8 and the center points 1 or 6 can be adapted to requirements, the ball plane 8, for instance, ideally halving the distance 1-6. This symmetry, however, is affected by the wear of centering surfaces 2'/3', the centering surfaces 50'/4' and plane faces 560/500 and by the plastic deformation of the window faces 71 by the balls 70, the outer part 12, the inner part 56 and the cage 34 shifting towards the left of the ball plane 8. If the outer part 12, the inner part 56 and the cage 34 shift on average by X mm, Y mm and Z mm in the period up to the half-way point of the service life of the joint, the distance of the center point 1 from the ball plane 8 is reduced by (X+Z) mm, while the distance of the center point 6 from the ball plane 8 is increased by (Y+Z) mm. In order to minimise the symmetry deviation of the ball plane 8 throughout the life of the joint, these offset values may be compensated in new joints. The ball plane 8, dependent on the determination of the axial position of the window faces 71, would first be moved left of the center point 3/4 of the centering faces 3' and 4' by Z mm, so that the ball plane would coincide with the center points 3/4 or 0 at the half-way stage of the life of the joint. The width of the supporting disk 50 would further be so selected that the distance 6-5 would be (X+Y) mm less than the distance 1-2; at the half-way stage of the life of the joint, the distances 0-6 and 0-1 would then be equal as illustrated in FIG. 1.

Figure 6:
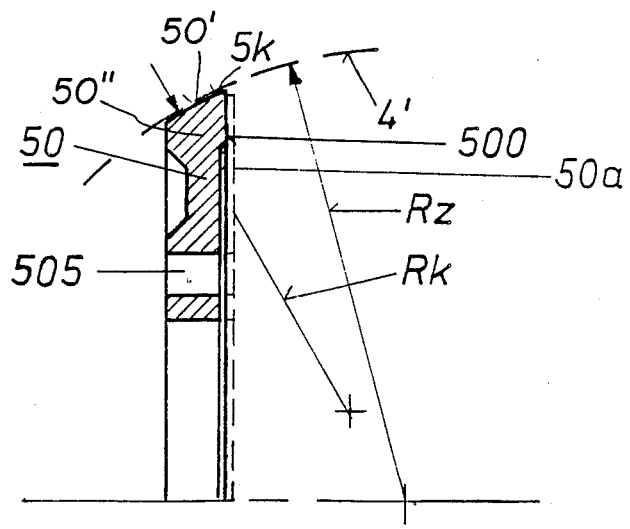
FIG. 6 is a half section of a supporting disk for a joint as shown in FIG. 1.

The central position of the ball plane could, after a certain operating period, alternatively be restored or optimised by installing a new supporting disk 20 of greater width or by suitable spacers 50a (see FIG. 6).

The supporting disk 50 is provided with recesses 501 approximately opposite the races 6' to ensure free movement for the balls at major angles of deflection, in particular during assembly of the joint. In order to prevent rotation of the supporting disk 50 caused by shocks, cyclical loading, turning of the cage or one-sided friction torques, splines 502 are provided. The splined bore 562 of the inner part 56 is shown for connection to a splined shaft (not illustrated). The extension of this shaft engages the splines 502, but with adequate radial play to allow the radial movement of the supporting disk 50 relatively to the inner part 56 to take place. The width of the separation gap 9 between the external surface 561 and the centering surface 4' here, is dimensioned for rough tolerances, and that these surfaces need not touch each other during maximum radial displacement of the inner part 56 relative to the supporting disk 50. With greater manufacturing precision or less heavy loading of the joint, however, this width can correspond to normal clearance conditions, being, for instance, equal to 1/1000 of the diameter.

In a joint according to prior art, the inner part with its external surface, which serves a centering surface, is directly centered on the internal centering face of the cage to pivot about the center of the joint. Referring back to the kinematics of the embodiment according to FIG. 1, the supporting disk 50 would have been designed quasi-integral with the inner part 56 or at least radially fixed to the inner part. The radial position of the inner part relative to the outer part would therefore be overdefined by two superimposed centering systems, so that both systems are subjected to opposing constraining forces and load concentrations.

Figure 1A:
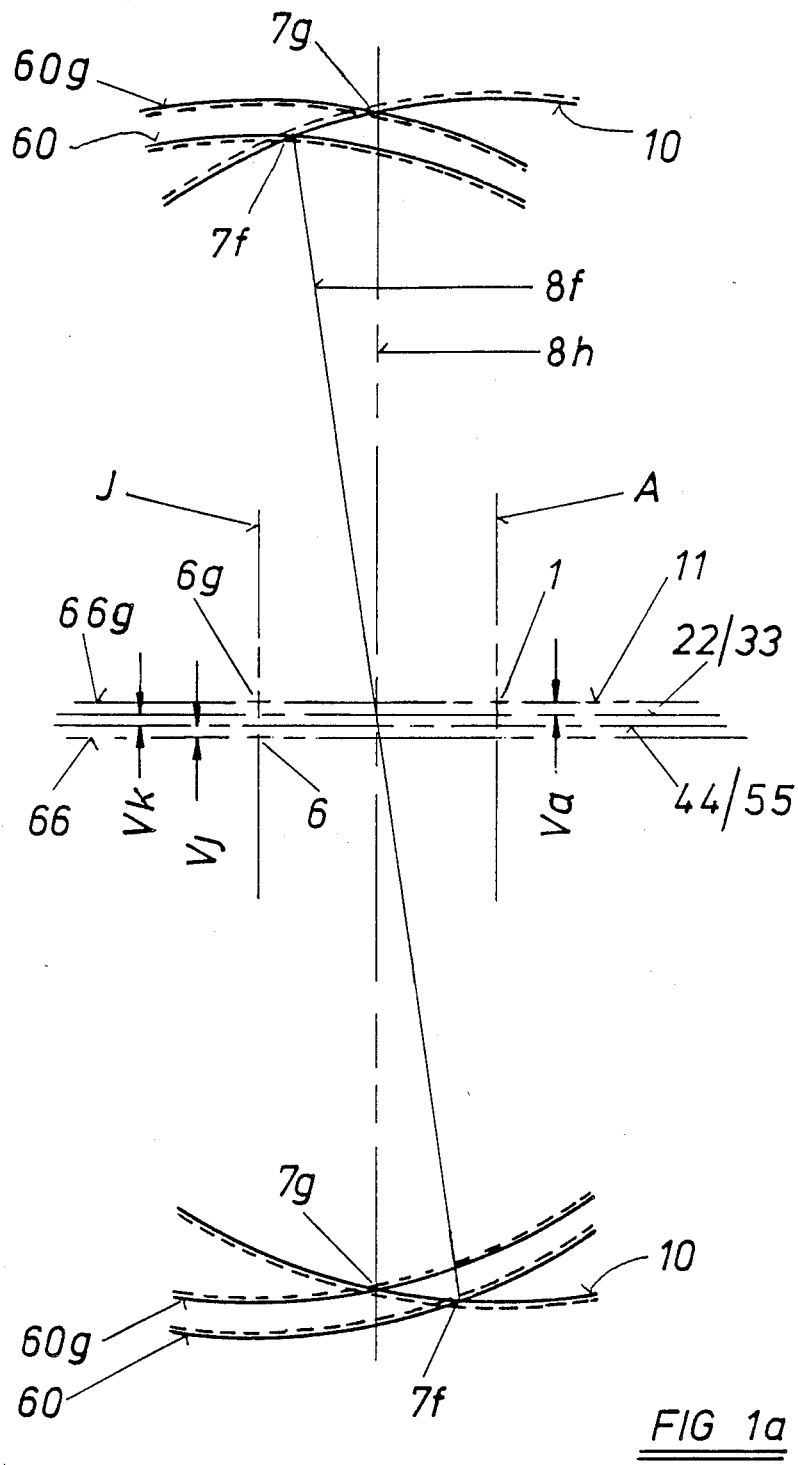
FIG. 1a illustrates the operating principle of the joint shown in FIG. 1 in the compensation of eccentricities of the centering and transmitting surfaces.

In FIG. 1a, the joint according to FIG. 1 in its straight condition is compared to prior art with reference to the effects of eccentricities. The common axis of rotation 22/33 of the centering surfaces 2'/3' is shown offset from the common axis of rotation 44/55 of the centering surfaces 4' and 50' by the assumed amount Vk. Vk therefore corresponds to the misalignment of the axes of the centering surfaces 3' and 4' relative to each other. The center points 1 and 6 are set with an assumed axial offset Va and Vj relative to the axes of rotation 22 and 55, lying in a radial plane A and J respectively. The center points 1 and 6 are further equidistant from the angle-bisecting plane 8h, thus avoiding axial asymmetry. The drawing plane corresponds to a meridian plane. In the meridian planes 11 and 66 lying at right angles to the drawing plane, there may be the race axes of further races, for instance in an 8-ball joint or as a result of rotation.

For unrestricted torque transmission, the axes of all corresponding races would have to intersect on one and the same plane, preferably the angle-bisecting plane 8h. As a result of the illustrated displacement of the center points 1 and 6, the race axes 10 and 60 lying in the drawing plane first intersect in 7f and form an inclined plane 8f, where the associated ball center points 7 or the ball plane 8 would have to go. The race axes deferred by 90 degrees and lying in the meridian planes 11 and 66 obviously do not intersect. If the joint is loaded by a torque, the meridian planes 11 and 66 approach each other, forcing the axes of rotation 22 and 23 as well as 44 and 55 apart, resulting in an at least partial elimination—depending on the amounts of eccentricity and play—of the radial play between the centring surfaces 2' and 3' as well as 4' and 50'. The normal forces increase accordingly. In this way, the races 1' and 6', the window faces 71 and the centering surfaces 2', 3', 4' and 50' are radially overloaded on one side.

Owing to the possibility of relative radial movement between the inner part 56 and the supporting disk 50 or between the races 6' and the centering surface 50' respectively, the center point 6 can move (two-dimensionally) in the radial plane J, going into 6g under the influences of radial forces. The meridian plane 66 shifts to 66g, balancing and compensating the offset values Vj+Vk+Va. The new race axes 60g intersect the race axes 10 of the outer part in 7g. The ball plane 8 coincides with the angle-bisecting plane 8h.

Figure 1B:
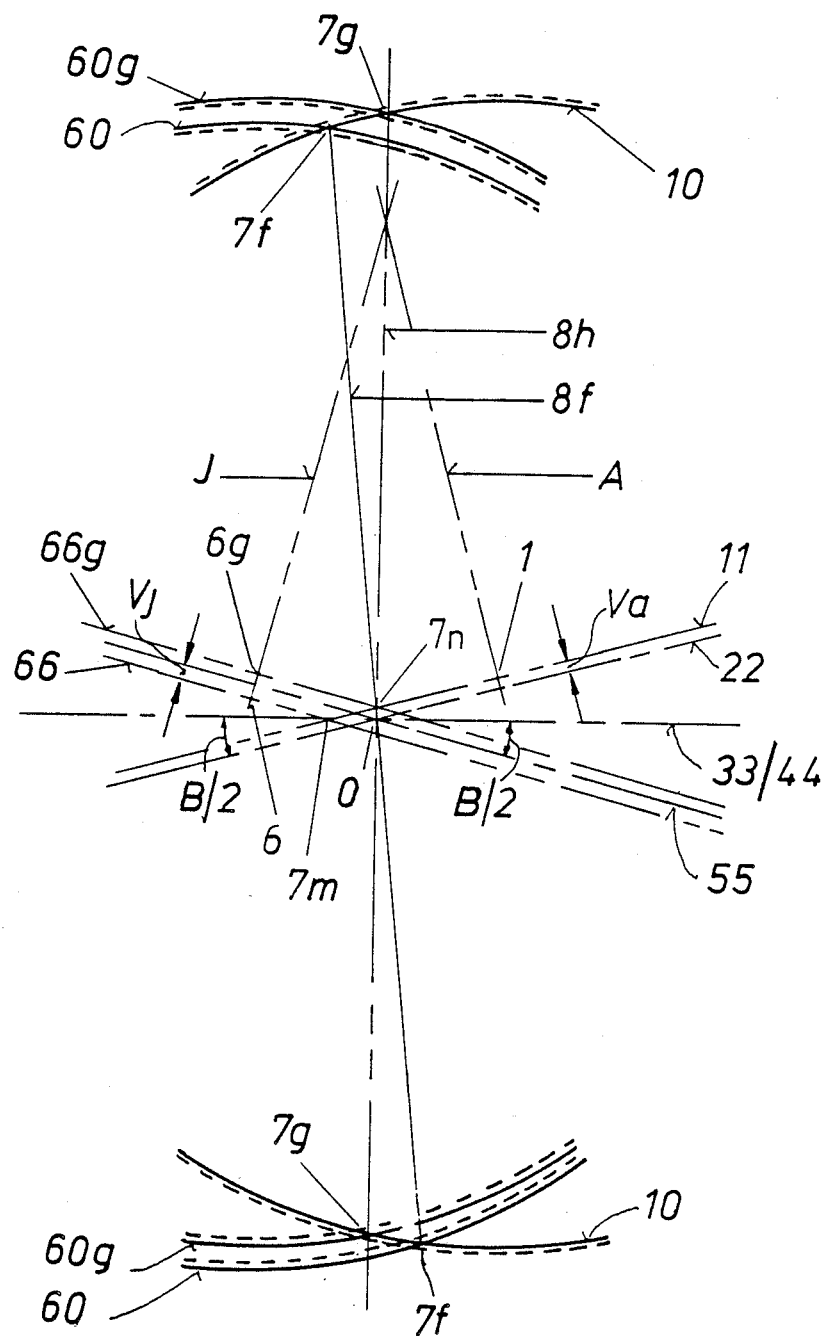
FIG. 1b illustrates the operating principle of the joint shown in FIG. 1 in its deflected condition in the compensation of eccentricities of the centering and transmitting surfaces.

In FIG. 1b, the joint according to FIG. 1 is again compared to prior art, this time, however, in its angular condition. The axis of rotation 55 of the centering surface 50' of the supporting disk 50 is deflected clockwise by half the angle of the joint B/2, while the axis of rotation 22 of the centering face 2' of the outer part 12 is deflected anti-clockwise, also by B/2. To simplify the illustration, we assume that the centering surfaces 3' and 4' of the cage 34 are concentric. The axes of rotation 33 and 44 of the centering surfaces 3' and 4' would be identical. The axes of rotation 22 and 55 of the centering surfaces 2' and 50' intersect the common axis of rotation 33/44 at 0 on the angle-bisecting plane 8h. The center point 1 and the meridian plane 11 are illustrated with an assumed axial offset Va relative to the axis of rotation 22, and the center point 1 lies on the radial plane A. The center point 6 and the meridian plane 66 are located with an assumed axial offset Vj relative to the axis of rotation 55, and the center point 6 lies on the radial plane J. There is no axial asymmetry between the planes A and J. The angle-bisecting plane 8h also bisects the angle between the planes A and J.

If no radial displacement is allowed between the center point 6 of the race axes 60 and the axis of rotation 55 of the centering surface 50', the joint is overdefined. The race axes 10 and 60 drawn from the offset centers 1 and 6 cross in 7f and form an inclined plane 8f. The meridian planes 11 and 66 intersect in 7m, where the ball center points lying in the meridian planes 11 and 66 are supposed to go. The point of intersection 7m is even outside the inclined plane 8f, leading to multiple distortion of the ball plane 8 and overloading of the joint.

Owing to the possibility of relative radial movement between the inner part 56 and the centering surface 50', the center point 6 can move (two-dimensionally) in the radial plane J, going into 6g under the influence of radial forces. Because of the symmetrical arrangement of the planes A and J, the center points 1 and 6g are equidistant from the angle-bisecting plane 8h. Vj is compensated directly in the plane J, Va in a mirror-inverted manner. The race axes 10 and 60g now intersect in 7n, causing the ball plane 8 to coincide with the homokinetic or angle-bisecting plane 8h. The offset point of intersection 7n of the meridian planes 11 and 66 now also lies on the angle-bisecting plane 8.

Whether the plane face 560 of the inner part is very precisely radial is largely immaterial. Though axial runout causes the plane J to wobble, resulting in changes in the distance between the center point 6g and the ball plane 8, this can, as will be explaned later, be largely compensated by suitable arrangement of the supporting disk 50.

Figure 1C:
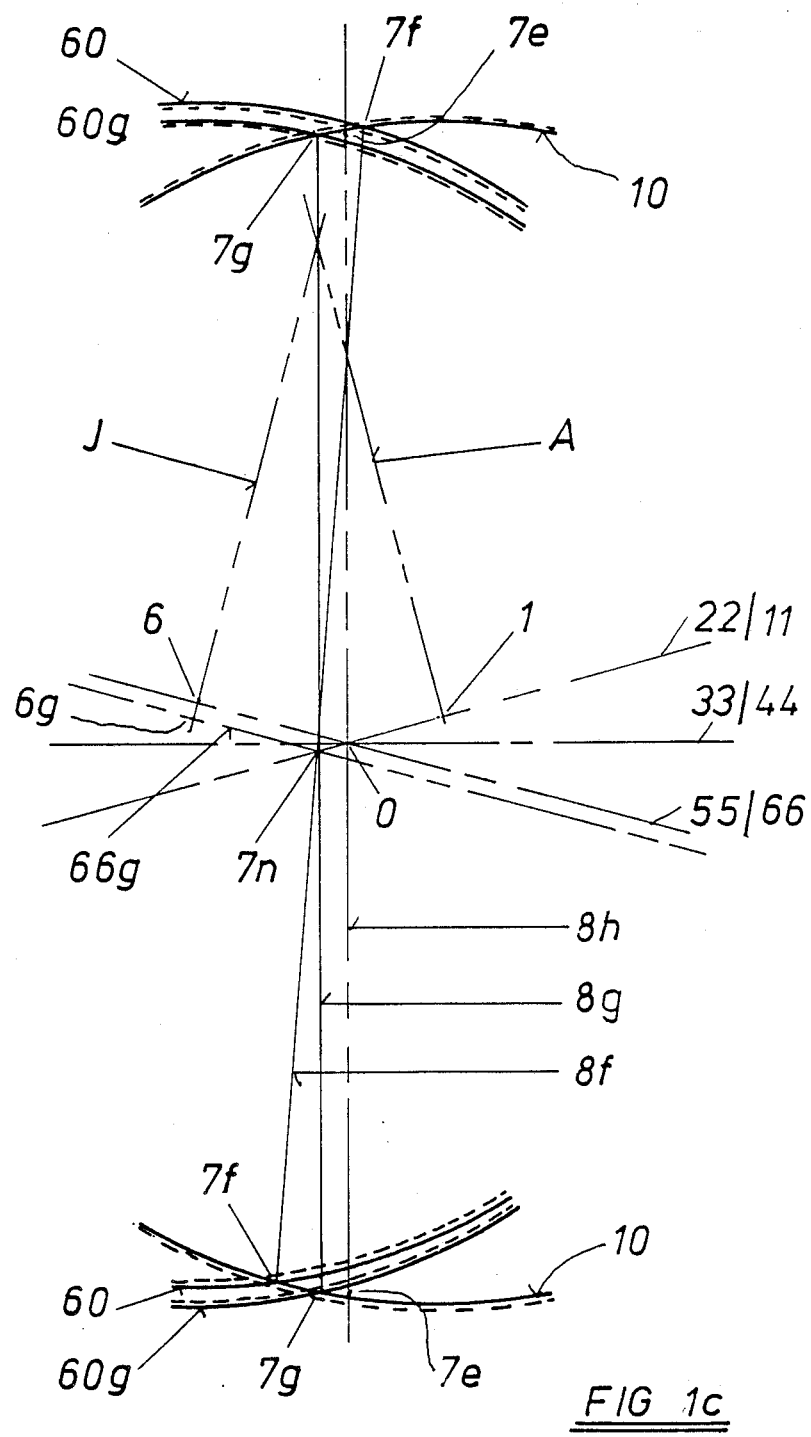
FIG. 1c illustrates the operating principle of the joint shown in FIG. 1 in its deflected condition in the compensation of symmetry deviations of the ball plane.

In continuation of FIG. 1b, FIG. 1c illustrates the correcting action of the supporting disk on axial symmetry deviations of the ball plane 8 of a joint according to FIG. 1 in its deflected state. For easier understanding, radial eccentricity errors are ignored—the meridian planes 11 and 66 coincide with the axes of rotation 22 and 55 of the centering surfaces 2' and 50'. The axes of rotation 22 and 55 intersect the common axis of rotation 33/44 of the centering surfaces 3' and 4' in 0. The distance of the center points 1 from the joint centre 0 is less than that of the center point 6.

In a joint according to prior art, the drawn race axes 10 and 60 intersect in 7f, forming an inclined plane 8f. This causes joint stiffness similar to the case of radial errors. In the joint according to the invention, the center point 6 can move two-dimensionally on the plane J (here only in the drawing plane), adopting the position 6g to avoid constraint, the center points 6g and 1 being on the same level. The race axes 10 and 60 intersect in 7g, resulting in an axially deferred but radial and thus angle-bisecting plane 8g. The displaced meridian plane 66g intersects the meridian plane 11 in 7n, on the plane 8g. In the present case, the plane 8g lies to the left of the angle-bisecting plane 8h, so that the center points 7e of the balls 70 on the angle-bisecting plane 8h are equidistant from the plane 8g and have rotary play relative to the corresponding races 1' and 6'. By a small torque between the inner part 56 and the outer part 12, all balls 70 are brought to bear.

Figure 1D:
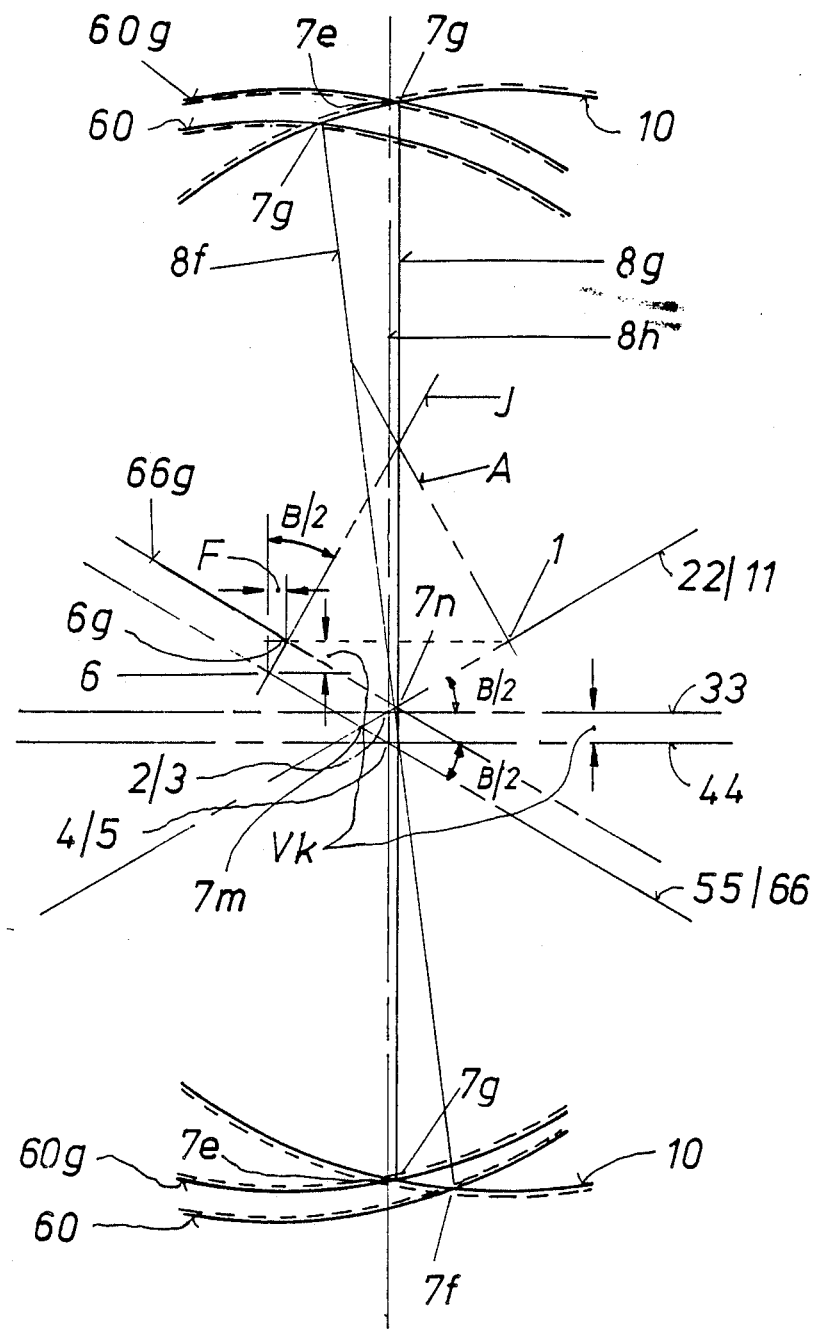
FIG. 1d illustrates the operating principle of the joint shown in FIG. 1 in its deflected condition in the compensation of eccentricities of the cage centering faces.

In further continuation of FIG. 1b, FIG. 1d illustrates the additional effect of a (radial) eccentricity between the centering surfaces 3' and 4' of the cage 34, though close tolerances can be maintained at relatively low cost in practical application. The axes of rotation 33 and 44 are drawn with an axial offset Vk. The axes of rotation 22 and 33 intersect on the angle-bisecting plane 8h in 2/3, the axes of rotation 44 and 55 in 4/5. The distances 1-2/3 and 6-4/5 are equal. The meridian planes 11 and 66 coincide with the axes of rotation 22 and 55.

In a joint according to prior art, the drawn race axes 10 and 60 intersect in 7f, forming the inclined plane 8f and causing an overdefinition of the centering and transmitting systems, in particular since the points of intersection 7m of the race axes lying in the meridian planes 11 and 66 are outside the inclined plane 8f. In a joint according to the invention, the meridian plane 66 can move along the plane J with the center point 6, adopting the positions 66g and 6g. The center points 6g and 1 are on the same level, but there is a difference of $F = Vk \times \tan B/2$ between their distances from the angle-bisecting plane 8h. The race axes 10 and 60g intersect in 7g, forming a radial and thus angle-bisecting plane 8g. Here, too, the points of intersection 7n of the race axes lying in the meridian planes 11 and 66g are in the plane 8g. In the present case, the plane 8g is to the right of the ball plane 8 by an amount F/2, so that the balls 70 with their center points 7e in the races 1' and 6' are pre-loaded. This pre-load can be eliminated by minor rotary play between the races 1' and 6' and the balls 70. It is, in any case, eliminated at a small torque.

Figure 2:
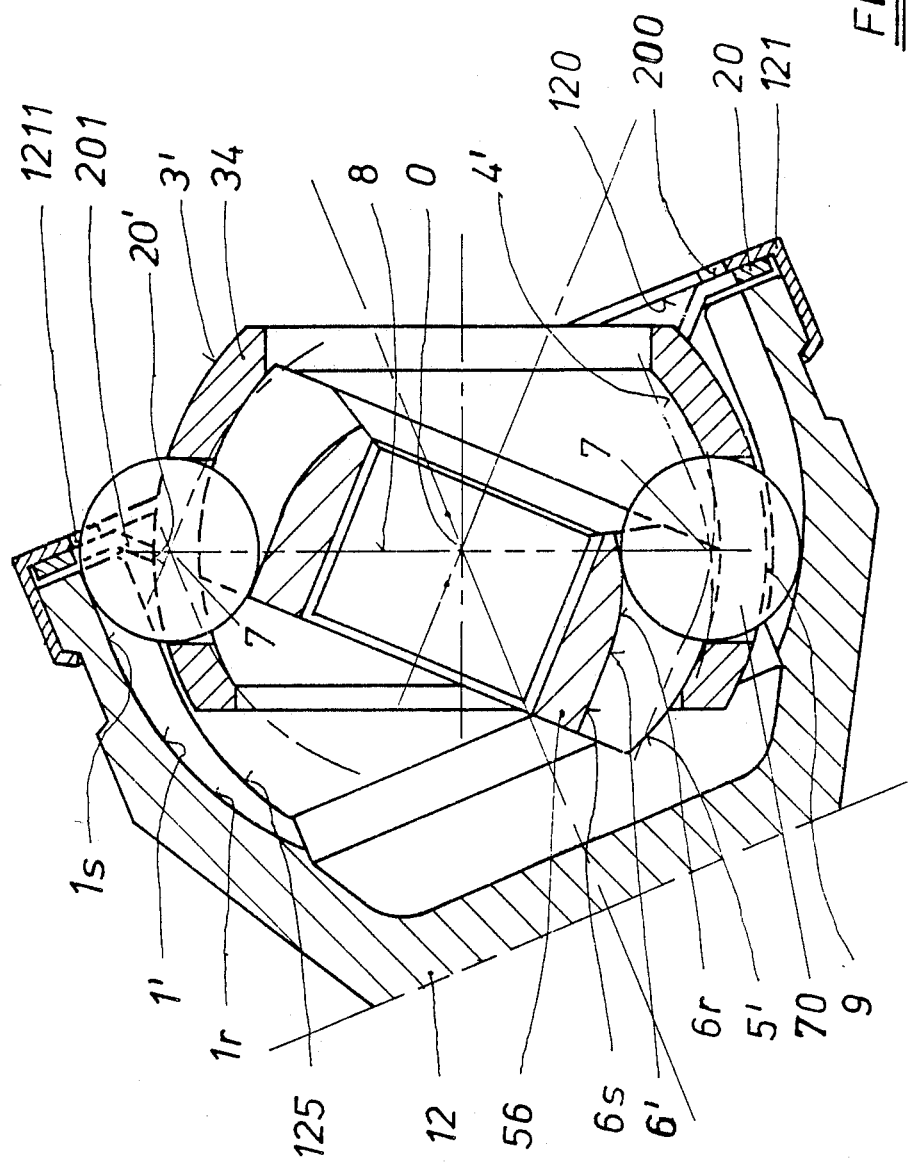
FIG. 2 is a longitudinal section of a joint according to the invention in its deflected condition, a supporting disk being provided between the cage and a plane face of the outer part.

The constant velocity fixed joint illustrated in FIG. 2 has features or arrangements which differ from those of the joint according to FIG. 1. The inner part 56 with its centering face 5' is directly centered in the centering surface 4' of the cage 34 to pivot about the joint center 0. The cage 34 with its centering surface 3' is guided in the centering surface 20' of the supporting disk 20 to pivot about the joint center 0, the plane face 200 of the supporting disk 20 being in contact with the plane face 120 of the retainer ring 121 mounted on the outer part 12 in a radially floating arrangement. The retainer ring 121 is fixed to the outer part 12. To ensure free movement of the balls 70 along their races 1', recesses 201 are provided in the supporting disk 20 and recesses 1211 in the retainer ring 121. The supporting disk 20 and the retainer ring 121 are secured against rotation relative to the outer part 12 (not illustrated).

When this embodiment of the joint is at angle, the relative radial positions of the transmitting parts 12 and 56 are affected by a number of additional factors compared to the straight joint. First, the balls 70 move to and fro along the races 1' and 6' and are therefore cyclically (per revolution) subjected to varying inaccuracies. The second variable is the radial distance of each ball 70 from the axis of rotation of the outer part 12 or the inner part 56 respectively, and the local elasticity of at least the outer part 12, resulting in differences between the transmitting forces of individual balls 70. Added to this is the effect of the secondary torque generated about the angle-bisecting axis, resulting in varying loading of diametrically opposite balls aside from the drawing plane.

A further factor having a special effect is the design of the races 1' and 6', which are not completely circular in the present case, having circular sections 1r and 6r with their center points 1 and 6 and straight sections 1s and 6s. The inclination of the race sections 1s and 6s relative to the ball plane 8 in the area of the top ball 70, i.e. at top dead center, exceeds that of the race sections 1r and 6r in the area of the bottom ball 70, i.e. at bottom dead center, so that the transmitting forces are asymmetrically divided, which has an additional influence on the eccentricity of the outer part relative to the inner part.

The radial position of the supporting disk 20 relative to the inner part 56 depends on the eccentricities of the centering surface 5' relative to the inner part 56 and of the centering surface 3' relative to the centering surface 4' of the cage 34 along the ball plane 8 and is therefore determined by the amount and the position of these eccentricities.

According to this embodiment, the outer part 12 and the supporting disk 20 are in a radially floating arrangement relative to each other, so that both the outer part 12 and the supporting disk 20 largely adopt the positions pre-determined by the prevailing eccentricities independently of each other.

The centering surface 3' of the cage 34 has allround circular contact with the centering surface 20' of the supporting disk 20, because the centering surface 3' would extend by half the maximum joint angle on both sides of the centering surface 2' in the straight condition of the joint.

Figure 2A:
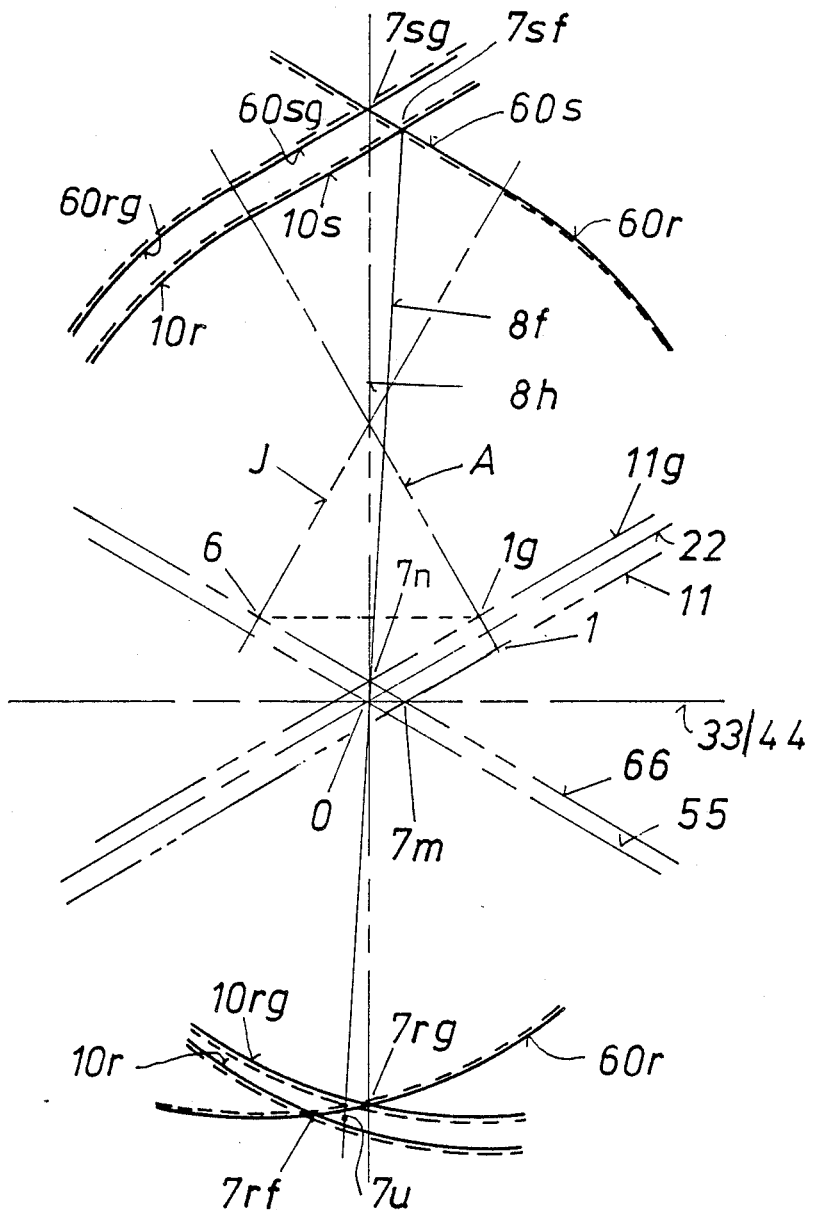
FIG. 2a illustrates the operating principle of the joint shown in FIG. 2 in the compensation of eccentricities of the centering and transmitting surfaces.

The compensation action of the supporting disk 20 can in principle be compared to that of the supporting disk 50 of FIG. 1. Nevertheless, FIG. 2a illustrates the different effect of the non-circular race arrangement. This axis of rotation 22 of the centering surface 20' of the supporting disk 20 intersects the axis of rotation 55 of the centering surface 5' and the common axis of rotation 33/44 of the centering surfaces 3' and 4' on the angle-bisecting plane 8h in 0. The center points 1 and 6 of the race sections 1r and 6r, which lie on the meridian planes 11 and 66, are shown antithetically offset relative to the axes of rotation 22 and 55, lying in the radial planes A and J, which are symmetrical in relation to the angle-bisecting plane 8h. Starting from the center points 1 and 6, the straight sections 10s and 60s and the circular sections 10r and 60r intersect in 7sf and 7rf. Owing to the different inclinations of the race axis sections, the distance of the upper point of intersection from the angle-bisecting plane 8h is smaller than that of the lower point of intersection 7rf. Even if the center point 7 of the top ball 70 with the ball plane 8 could be pivoted as far as the upper point of intersection 7sf i.e. up to plane 8f, against the action of the centering forces, the lower center point 7u would still be far away from the sections 10r and 60r, i.e. the bottom ball 70 would still have play relative to the race sections 1r and 6r, so that balls 70 near bottom dead center can easily be excluded from torque transmission. This results in a further noticeable reduction in the transmitting performance of the joint. The race axes on the meridian planes 11 and 66 intersect in 7m, also at a considerable distance from an adjusted ball plane.

The relative radial movement of the outer part 12 and the supporting disk 20 largely eliminates the disadvantages of non-circular races, even taking into account the different radial components of the transmitting forces. The center point 1 shifts to 1g, the meridian plane 11 to 11g. The drawn race axis sections 60s and 60sg and 60r and 10rg now intersect in 7sg and 7rg and lie on the angle-bisecting plane 8h. The race axes deferred by 90 degrees, which lie in the meridian planes 11g and 66, intersect in 7n, also on the angle-bisecting plane 8h. In total, the negative effects of radial and/or axial errors are largely eliminated by a basically quite simple component, irrespective of whether these errors are the result of manufacturing tolerances, of wear, or asymmetrical loading by race design, elasticity or even secondary torque.

The performance advantages achieved by this design are considerable and can be utilised differently in practical applications. First, less close tolerances are required, resulting in a reduction of manufacturing costs. With reference to FIG. 2, this applies in particular to the concentricity of the races 1' relative to the internal surface 121 of the outer part 12—this internal surface 121 no longer requires precise machining—and of the races 6' relative to the centering surface 5' of the inner part 56. In the case of joint according to prior art, these faces have to be manufactures with a very high precision, generally involving grinding operations, which in turn necessitates additional ground datum planes.

Second, the transmission capacity with regard to static torque and endurance can be improved, or the joint angle can be increased relevantly in continuous operation. Owing to the stress relieving during torque, transmission, temperature rise averages, and in particular spread, are noticeably reduced, permitting the use of simpler lubricants and bods. As a result of the lower heat generation values, the joints if installed in other assemblies, such as the wheel bearings of motor vehicles, would also run with less problems.

The more precise steering moreover considerably improves the qualities and the quiet running properties of the joint, resulting in improved driver comfort; and last but not least, the use of races with non-circular sections, which permits, among other advantages, the increase of the maximum angle of flexure, does not significantly reduce the performance of the joint.

Figure 3:
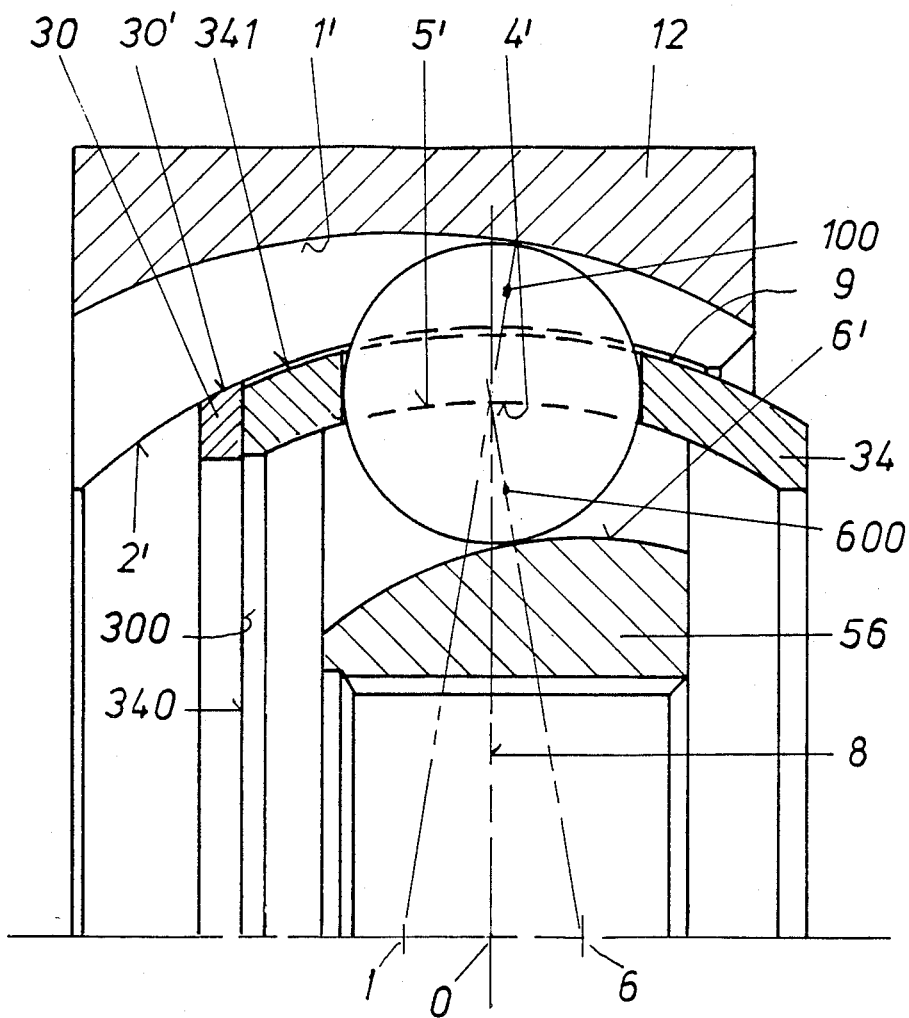
FIG. 3 is a half longitudinal section of a joint according to the invention in its straight condition, a supporting disk being provided between the outer part and a plane face of the cage.

FIG. 3 shows a further embodiment of the joint according to the invention based on the joint illustrated in FIG. 1 but having the following special features. The inner part 56 with its centering surface 5' is held in the centering surface 4' of the cage 34 to pivot about the joint center 0. The outer part 12 with its centering surface 2' is guided by means of the centering surface 30' of the supporting disk 30 to pivot about the joint center 0, the plane face 300 of the supporting disk 30 being in contact with the plane face 340 of the cage 34; allowing radial movement between the supporting disk and the cage.

In this embodiment of the invention, a radially floating arrangement of the cage 34 and the supporting disk 30 is allowed, compensating any axial offset of the external surface 341 relative to the internal centering surface 4' of the cage 34. In the straight condition of the joint, all offset values are balanced out and fully compensated. In the flexed condition, the axial offset values between the races 1' and the centering surface 2' of the outer part and between the races 6' and the centering surface 5' of the inner part 56 are vectorially compensated in the direction of the plane faces 300/400, i.e. in the direction of the ball plane 8 respectively. The ball plane 8 remains in an angle-bisecting position.

Figure 3A:
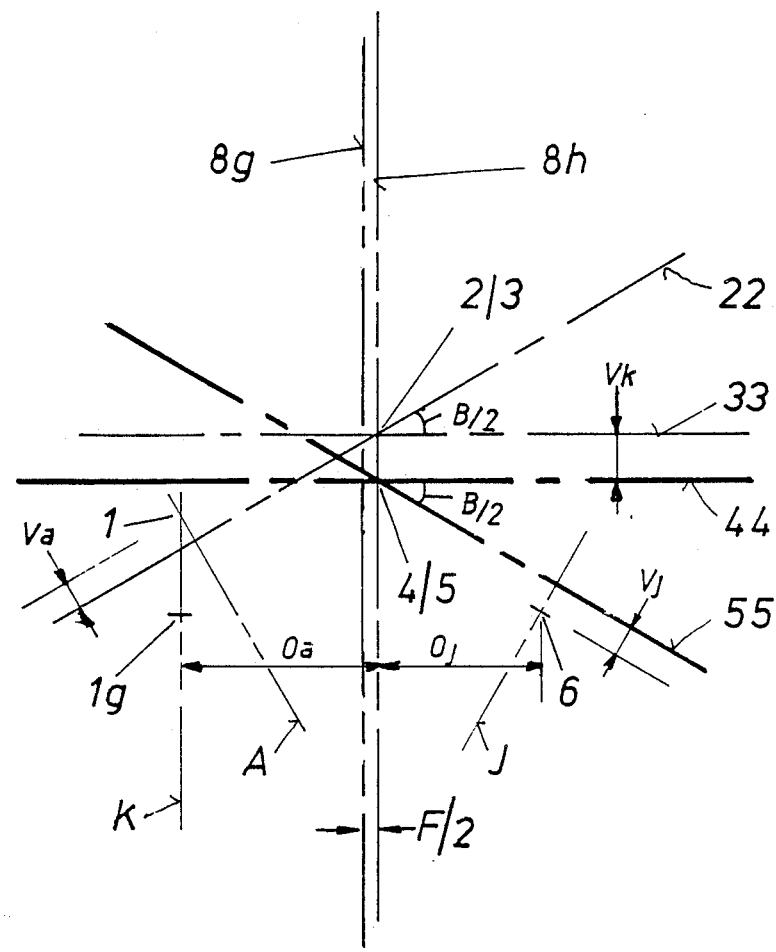
FIG. 3a illustrates the operating principle of the joint shown in FIG. 3 in the compensation of eccentricities of the centering and transmitting surfaces.

This is illustrated in FIG. 3a with reference to the joint shown in FIG. 3. The axes of rotation 33 and 44 of the centering surfaces 30' of the supporting disk 30 and 4' of the cage 34 are apart by the assumed amount of their eccentricity Vk. The axes of rotation 22 and 33 of the centering surfaces 2' and 30' intersect in 2/3 on the angle-bisecting plane 8h, while the axes of rotation 44 and 55 (shown more boldly) of the centering surfaces 4' and 5' intersect in 4/5, also on the angle-bisecting plane 8h.

The center points 1 and 6 of the races 1' and 6' lie on the radial planes A and J. The radial displacement between the supporting disk 30 and the cage 34 causes the center point 1 together with the axes of rotation 22 and 33 to shift in the direction of the plane faces 300/340 and in the radial plane K (two-dimensionally) and to adopt the position 1g. The center points 1g and 6 would be at approximately the same level. In this way, offset Vk is balanced and offsets Va and Vj are vectorially compensated in the direction of the plane K. Similar to FIG. 1d, an offset difference $F=(0a-0j)$ is generated, which has an approximate value of $(Va+Vj)\times \sin B/2$ and causes an axial displacement of the ball plane by $F/2$.

The joint according to FIG. 3 offers the special advantage of a supporting disk 30 without recesses, which, irrespective of the angle of flexure, does not require any means for limiting its rotation.

Figure 4:
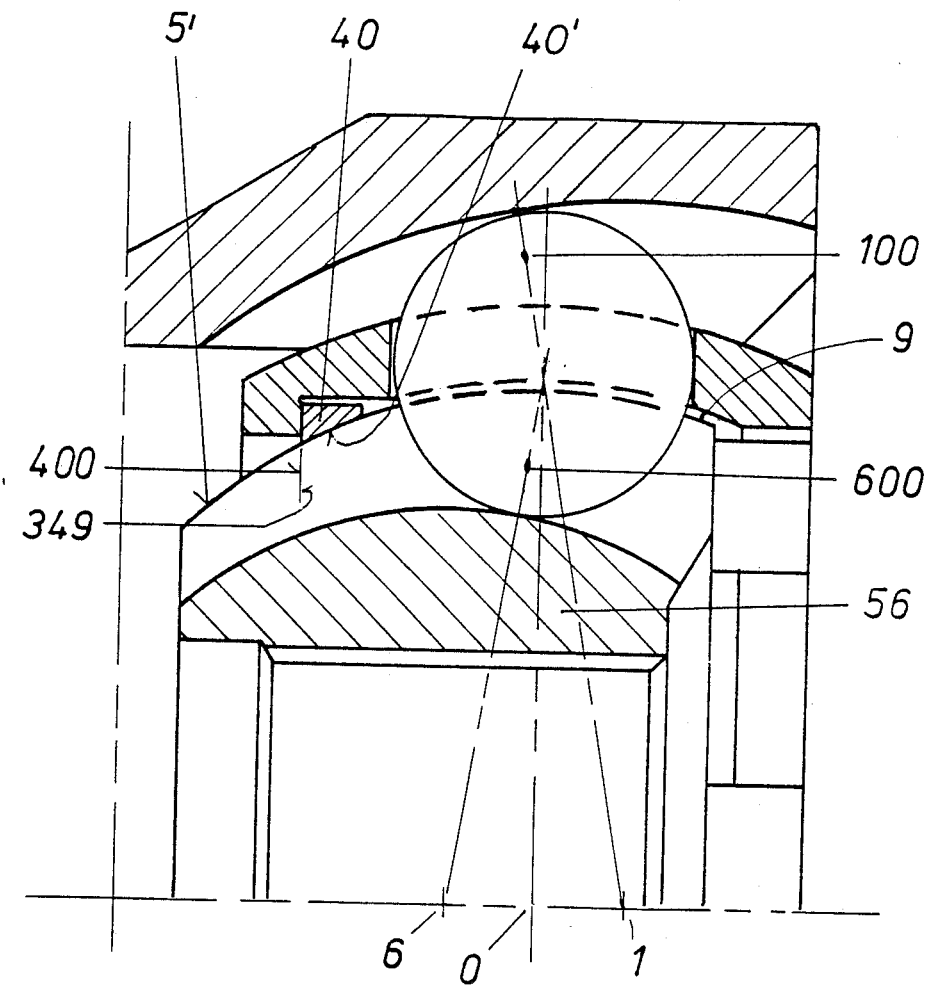
FIG. 4 is a half longitudinal section of a joint according to the invention in its straight condition, a supporting disk being provided between the inner part and a plane face of the cage.

FIG. 4 illustrates a further embodiment of the joint shown in FIG. 1 with the following differences. The inner part 56 with its centering face 5' is guided in the centering surface 40' of the supporting disk 40' to pivot about the joint center 0, the plane face 400 of the supporting disk 40 being in contact with a plane face 349 on the cage 34; a radial movement is allowed between the supporting disk and the cage. The function and the special advantages of this embodiment are in principle similar to those of the joint according to FIG. 3.

Figure 5:
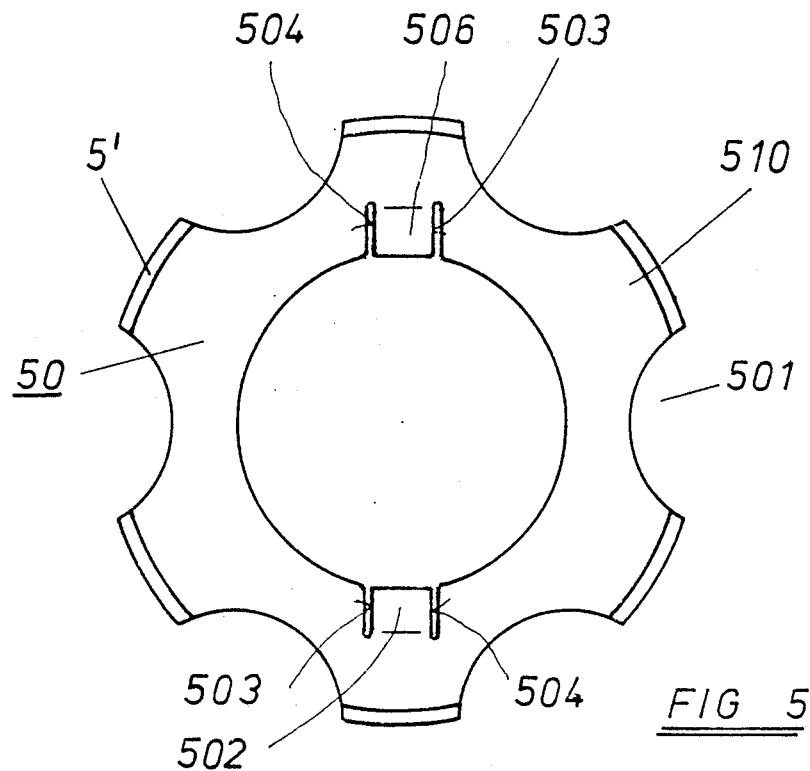
FIG. 5 illustrates a supporting disk for a joint as shown in FIG. 1.

FIG. 5 shows a supporting disk 50 with recesses 501 and bands 510. The convex centering surface 50' is made spherical. To prevent rotation of the supporting disk 50 relative to the corresponding inner part (not illustrated) in a positive manner, two deeper teeth 502 and 506, each having two stop faces 503 and 504, are provided. The stops engage mating stops (grooves) on the inner part with allround play, maintaining the radial float or movement of the supporting disk 50. A spacer of a shape similar to that of the supporting disk 50 and made of a suitable material can be inserted between the plane faces 500/560 (FIG. 1).

FIG. 6 shows a supporting disk 50 with its plane face 500; the centering surface 50' has a conformity—both in longitudinal and in cross-section, relative to the corresponding centering surface 4' (broken line). The centering surface 50' consists of several part surfaces 5k (one per web 510) of a spherical shape and having a smaller radius Rk than the radius Rz of the centering surface 4', resulting in a quasi multi-point contact between the centring faces 4' and 5k. The through-hole 505 secures the supporting disk against rotation relative to the inner part by means of a smaller pin (not illustrated) on the inner part 56.

The supporting disk may be made of a variety of materials, such as bearing materials or plastic materials 50" with good sliding properties, or coated or impregnated with a corrosion or friction reducing coating 50''. A spacer 50a (broken line, such as a radially floating spacer, can be installed between the plane face 500 and the plane face 560 of the inner part. Between the plane faces 500 and 560 (of the inner part) there may further be provided balls in suitable pockets to provide for low-friction rolling guidance. Pockets on both sides can be used to secure the supporting disk 50 against rotation relative to the inner part 56.

The teeth 502 and 506 of FIG. 5 can be set sufficiently deep to touch the base of the grooves on the inner part (not illustrated) first. On further axial compression of the inner part 56 onto the supporting disk 50, the plane faces 560 and 500 (see FIG. 1) come into contact. The teeth 502 and 506 thus act as axial spring elements. Any play between the balls 70 and the races 1' and 6' in the torque-free condition of the joint is compensated in this way, thus eliminating or at least reducing play-induced joint noise during operation with alternating torque. The temporary separation of the plane faces improves the supply of fresh lubricant between the plane faces. A similar effect is achieved with the spacer 50a of FIG. 6 by giving it a flexed, for instance slightly conical, shape.

In extreme conditions, such as occur at high loading or high angles or excessive play or wear conditions, it could be advisable to prevent the parts providing the separation gap 9 to come in direct contact with each other, thus minimising friction losses therebetween and assuring smooth running of the joint. Referring to FIG. 1, this can be achieved if the radial play between the splines 502 and the splines of the splined shaft (not illustrated) is less than the width of the separation gap 9. Referring to FIG. 2, this can be achieved if the radial play between the supporting disc 20 and the retainer ring 121 is less than the width of the separation gap 9. Referring to FIG. 4, this can be achieved if the radial play between the supporting disc 40 and the cage (34) is less than the width of the separation gap 9.

The joint could be fitted with two supporting disks, for instance in a combination of FIGS. 1 and 2, 1 and 3 or 2 and 4, but this would involve somewhat higher costs. The radial position of the cage in the straight joint is not positively determined.

The idea of this invention has been explained with reference to constant velocity fixed joints with races lying in meridian planes. Joints with races not lying in meridian planes, for instance joints with spiral races, can be optimised in a similar manner, one supporting disk coming into effect for one direction of torque.

I claim:

1. A constant velocity fixed joint with three main parts comprising two transmitting parts and a cage, said transmitting parts comprising a hollow outer part having races on its internal surface and an inner part having corresponding races on its external surface, with balls disposed in said races for torque transmission, said cage being located in the space between said transmitting parts and having windows therein holding the centers of said balls in a ball plane, the points of contact of said balls with said races lying on one side of said ball plane at least for one direction of torque and in the straight position of the joint, said main parts being adapted for relative angular travel about a joint center by means of an external centering surface angularly displaceable with said inner part coacting with an internal centering surface angularly displaceable with said cage and an external centering surface angularly displaceable with said cage coacting with an internal centering surface angularly displaceable with said outer part, wherein one said centering surface (50', 20', 30', 40') is associated with a supporting disk (50, 20, 30, 40) angularly displaceable with one of said main parts (56, 12, 34) on which said one main part (56, 12, 34) is axially supported but radially displaceable.

2. A constant velocity fixed joint according to claim 1, wherein said supporting disk (50) is inserted between said internal centering surface (4') of said cage (34) and a plane face (560) of said inner part (56) lying on said one side of said ball plane (8).

3. A constant velocity fixed joint according to claim 1, wherein said supporting disk (20) is inserted between said external centering surface (3') of said cage (34) and a plane face (120) of said outer part (12) lying on the other side of said ball plane (8).

4. A constant velocity fixed joint according to claim 1, wherein said supporting disk (30) is inserted between said internal centering surface (2') of said outer part (12) and a plane face (340) of said cage (34) lying on said other side of said ball plane (8).

5. A constant velocity fixed joint according to claim 4, wherein said centering surface (30') of said supporting disk (30) provides a smaller radius of curvature than that of said internal centering surface (2') of said outer part (12).

6. A constant velocity fixed joint according to claim 1, wherein said supporting disk (40) is inserted between said external centering surface (5') of said inner part (56) and a plane face (349) of said cage (34) lying on said one side of said ball plane (8).

7. A constant velocity fixed joint according to claim 6, wherein said centering surface (40') of said supporting disk (40) provides a bigger radius of curvature than that of said external centering surface (5') of said inner part (56).

8. A constant velocity fixed joint according to one of the claims 1, 2, 3, 4, or 6 wherein at least one radially floating spacer (50a) is inserted between said supporting disk (50, 20, 30, 40) and the corresponding plane face (560, 120, 340, 349).

9. A constant velocity fixed joint according to one of the claims 1, 2, 3, 4, or 6 wherein after axial displacement of said ball plane (8) relative to said cage (34) towards said other side of said ball plane, as a result of dents caused by the penetration of said balls (70) in the window faces (71) of said cage (34) in the course of half of the service life of said joint, said joint center (0) lies in said ball plane (8).

10. A constant velocity fixed joint according to one of the claims 1, 2, 3, 4, or 6 wherein after axial displacement due to wear of said centering surfaces (2', 20', 3', 30', 4', 40', 5', 50'), and plane faces (500, 560, 200, 120, 300, 340, 400, 349), in the course of half the service life of said joint, the offset (0–1) between the center (1) of said races (10, 10r) of said outer part (12) to said joint center (0) is equal to the offset (0–6) between the center (6) of said races (60, 60r) of said inner part (56) to said joint center (0).

11. A constant velocity fixed joint according to claim 1, wherein a separation gap (9) is provided between the two said main parts (56, 34, 12) in contact with said supporting disk (50, 20, 30, 40).

12. A constant velocity fixed joint according to claim 11, wherein the minimum width of said separation gap (9) approximately corresponds to the maximum expected radial displacement between said two main parts defining said separation gap.

13. A constant velocity fixed joint according to claim 1, wherein said supporting disk (50, 20, 30, 40) is made of a plastic material with good sliding properties.

14. A constant velocity fixed joint according to claim 1, wherein said centering surface (4', 3', 2', 5') corresponding with said supporting disk (50, 20, 30, 40) extends on both sides of its point of contact with said supporting disk by an arcual length of approximately half the maximum angle of the joint.

15. A constant velocity fixed joint according to claim 1, wherein said supporting disk (50, 20, 30, 40) is provided with a corrosion reducing coating.

16. A constant velocity fixed joint according to claim 1, wherein said supporting disk (50, 20, 30, 40) is provided with a friction reducing coating.

17. A constant velocity fixed joint according to claim 1, wherein the center of curvature of at least one section (10s, 60s) of the axes (10, 60) of said races (1', 6') lies at a distance from the respective axis of rotation of said outer or inner part (12 or 56).

18. A constant velocity fixed joint according to claim 17, wherein said races (10, 60) of said outer or inner part are formed undercutfree.

19. A constant velocity fixed joint according to claim 1, wherein means (502, 506, 50a) for exerting a spring force axially separating said supporting disk (50, 20, 30, 40) from said one main part (56, 12, 34) are provided.

20. A constant velocity fixed joint according to claim 1, wherein said radial movement of said one main part (56, 12 or 34) relative to said supporting disk (50, 20, 30 or 40) is limited, by abutments, to a value less than said minimal width of a separation gap.

21. A constant velocity fixed joint with three main parts comprising two transmitting parts and a cage, said transmitting parts comprising a hollow outer part having races on its internal surface and an inner part having corresponding races on its external surface, with balls disposed in said races for torque transmission, said cage located in the space between said transmitting parts, having windows therein holding the centers of said balls in a ball plane, the points of contact of said balls with said races lying on one side of said ball plane at least for one direction of torque and in the straight position of the joint, said main parts being adapted for relative angular displacement about a joint center by means of an external centering surface angularly displaceable with said inner part coacting with an internal centering surface located at the internal surface of said cage, and an external centering surface located at the external surface of said cage coacting with an internal centering surface located at the internal surface of said outer part, wherein said external centering surface (50') angularly displaceable with said inner part (56) is associated with a supporting disk (50) on which said inner part is axially supported but radially displaceable.

22. A constant velocity fixed joint according to claim 2 or 21, wherein said supporting disk (50) provides recesses (501) at an extension of said races (6') of said inner part (56) and rotational abutment means (502, 503, 504, 505), limiting the rotation between said supporting disk (50) and said inner part, are provided.

23. A constant velocity fixed joint according to claim 22, wherein said supporting disk (50) is provided with spline abutments (502) placed at the extension of the splines (562) of said inner part (56).

24. A constant velocity fixed joint according to claim 22, wherein said centering surface (50') of said supporting disk (50) provides a smaller radius of curvature than that of said internal centering surface (4') of said cage (34) in at least one of longitudinal and transverse directions.

25. A constant velocity fixed joint with three main parts comprising two transmitting parts and a cage, said transmitting parts comprising a hollow outer part having races on its internal surface and an inner part having corresponding races on its external surface, with balls disposed in said races for torque transmission, said cage being located in the space between said transmitting parts and having windows therein holding the centers of said balls in a ball plane, the points of contact of said balls with said races lying on one side of said ball plane at least for one direction of torque and in the straight position of the joint, said main parts being adapted for relative angular displacement about a joint center by means of an external centering surface located at the external surface of said inner part coacting with an internal centering surface located at the internal surface of said cage, and an external centering surface located at the external surface of said cage coacting with an internal centering surface angularly displaceable with said outer part, wherein said internal centering surface (20') angularly displaceable with said outer part (12) is associated with a supporting disk (20) on which said outer part is axially supported but radially displaceable.

26. A constant velocity fixed joint according to claim 3 or 25, wherein said supporting disk (20) provides recesses (201) at an extension of said races (1') of said outer part (12) and rotational abutment means, limiting the rotation between said supporting disk (20) and said outer part, are provided.

27. A constant velocity fixed joint according to claim 26, wherein said centering surface (20') of said supporting disk (20) provides a bigger radius of curvature than that of said external centering surface (3') of said cage (34) in at least one of longitudinal and transverse directions.

28. A constant velocity fixed joint according to claim 3 or 25, wherein said inner surface (125) of said outer part (12) is formed undercutfree in the direction of said supporting disk (20).

29. A constant velocity fixed joint with three main parts comprising two transmitting parts and a cage, said transmitting parts comprising a hollow outer part having races at its internal surface and an inner part having corresponding races at its external surface, with balls disposed in said races for torque transmission, and said cage being located in the space between said transmitting parts and having windows therein holding the centers of said balls in a ball plane, the points of contact of said balls with said races lying on one side of said ball plane at least for one direction of torque and in the straight position of the joint, said main parts being adapted for relative angular displacement about a joint center by means of an external centering surface located at the external surface of said inner part coacting with an internal centering surface located at the internal surface of said cage, and an external centering surface angularly displaceable with said cage coacting with an internal centering surface located at the internal surface of said outer part, wherein said external centering surface (30') angularly displaceable with said cage (34) is associated with a supporting disk (30) on which said cage is axially supported but radially displaceable.

30. A constant velocity fixed joint with three main parts comprising two transmitting parts and a cage, said transmitting parts comprising a hollow outer part having races at its internal surface and an inner part having corresponding races at its external surface, with balls disposed in said races for torque transmission, said cage being located in the space between said transmitting parts and having windows therein holding the centers of said balls in a ball plane, the points of contact of said balls with said races lying on one side of said ball plane at least for one direction of torque and in the straight position of the joint, said main parts being adapted for relative angular displacement about a joint center by means of an external centering surface located at the external surface of said inner part coacting with an internal centering surface angularly displaceable with said cage, and an external centering surface located at the external surface of said cage coacting with an internal centering surface located at the internal surface of said outer part, wherein said internal centering surface (40′) angularly displaceable with said cage (34) is associated with a supporting disk (40) on which said cage is axially supported but radially displaceable.

* * * * *